(12) United States Patent
Nakao et al.

(10) Patent No.: US 8,284,363 B2
(45) Date of Patent: Oct. 9, 2012

(54) OCB MODE LIQUID CRYSTAL DISPLAY WITH TRANSITION NUCLEUS FORMING SECTION

(75) Inventors: Kenji Nakao, Kanazawa (JP); Hirofumi Wakemoto, Kanazawa (JP); Tetsuya Kojima, Ishikawa-gun (JP); Tetsuo Fukami, Ishikawa-gun (JP); Yuko Kizu, Yokohama (JP); Rei Hasegawa, Yokohama (JP); Yukio Kizaki, Kawasaki (JP)

(73) Assignees: Japan Display Central Inc., Fukaya-shi (JP); Kabushiki Kaisha Toshiba, Tokyo (JP)

( * ) Notice: Subject to any disclaimer, the term of this patent is extended or adjusted under 35 U.S.C. 154(b) by 1050 days.

(21) Appl. No.: 12/236,868

(22) Filed: Sep. 24, 2008

(65) Prior Publication Data

US 2009/0079675 A1 Mar. 26, 2009

(30) Foreign Application Priority Data

Sep. 26, 2007 (JP) ................................. 2007-250209

(51) Int. Cl.
*G02F 1/141* (2006.01)
*G02F 1/1337* (2006.01)
*G02F 1/1343* (2006.01)

(52) U.S. Cl. ......... 349/136; 349/124; 349/129; 349/146

(58) Field of Classification Search .................... 349/33, 349/139, 124, 129, 136, 146
See application file for complete search history.

(56) References Cited

U.S. PATENT DOCUMENTS

| 2006/0055858 A1* | 3/2006 | Nakanishi et al. ............ 349/139 |
| 2006/0114395 A1* | 6/2006 | Kwon ............................ 349/139 |
| 2006/0274017 A1 | 12/2006 | Nakao |
| 2007/0177091 A1* | 8/2007 | Song et al. ..................... 349/143 |
| 2008/0198124 A1 | 8/2008 | Kojima et al. |

FOREIGN PATENT DOCUMENTS

| JP | 2003-107506 | 4/2003 |
| JP | 2003-280036 | 10/2003 |

OTHER PUBLICATIONS

U.S. Appl. No 12/211,964, filed Sep. 17, 2008, Yukio Kizaki, et al.
U.S. Appl. No. 12/211,940, filed Sep 17, 2008, Kizaki, et al.

* cited by examiner

*Primary Examiner* — Nathanael R Briggs
(74) *Attorney, Agent, or Firm* — Oblon, Spivak, McClelland, Maier & Neustadt, L.L.P.

(57) ABSTRACT

A device includes a substrate including a first insulating substrate, a first electrode located on the first insulating substrate, and a second electrode located between the first insulating substrate and the first electrode via an insulating underlayer interposed between the second and the first electrode, a substrate including a second insulating substrate and a third electrode on the second insulating substrate, a liquid crystal layer which is held between the first and the third electrode and which exhibits a transition from a first state to a second state in an initializing process, and a voltage supply unit which supplies, a first voltage to the first and the second electrodes and a second voltage to the third electrode, wherein the first electrode includes a transition nucleus forming section which forms nuclei of the transition in the liquid crystal layer on the basis of the respective voltages supplied to the respective electrodes.

9 Claims, 5 Drawing Sheets

OCB MODE LIQUID CRYSTAL DISPLAY WITH TRANSITION NUCLEUS FORMING SECTION

CROSS-REFERENCE TO RELATED APPLICATIONS

This application is based upon and claims the benefit of priority from prior Japanese Patent Application No. 2007-250209, filed Sep. 26, 2007, the entire contents of which are incorporated herein by reference.

BACKGROUND OF THE INVENTION

1. Field of the Invention

The present invention relates to a liquid crystal display device.

2. Description of the Related Art

In an OCB (optically compensated bend) mode liquid crystal display device, a bend alignment is created in a liquid crystal material, and the tilt angles of liquid crystal molecules near alignment films are varied, thereby varying the retardation of a liquid crystal layer. The OCB mode is one of display modes which can realize a high response speed and excellent viewing angle characteristics. In recent years, attention has been paid to the OCB mode.

In the OCB mode liquid crystal display device, as described above, it is necessary to create a bend alignment in the liquid crystal material. However, in an initial state prior to power-on, a splay alignment is created in the liquid crystal material. The reason for this is that the splay alignment is, inherently, more stable than the bend alignment for the liquid crystal material. Thus, when the OCB mode liquid crystal display device is activated, it is necessary to perform a transition the alignment of the liquid crystal material from the splay alignment to the bend alignment.

In order to cause the transition, it is necessary to apply energy, which is greater than a difference in state energy between the bend alignment and splay alignment, to the liquid crystal material. An example of the method for the transition of the liquid crystal material is a method in which electrostatic energy is applied by voltage application to a liquid crystal cell. In this case, since the progress of transition is slow with the application of a voltage corresponding to the state energy difference between the bend alignment and splay alignment, it is necessary, in fact, to apply a very high voltage. Besides, since this transition process tends to be easily affected by the shape of the substrate surface or an electric field distribution, there are cases in which an area with no transition remains in the liquid crystal layer.

In the prior art, in order to solve this problem, the following technique is proposed (Jpn. Pat. Appln. KOKAI Publication No. 2003-280036). Bend patterns with intruding and recessed shapes (hereinafter referred to as "transition nucleus patterns") are provided around neighboring pixels. A potential difference is applied between the pixel electrodes, and at the same time a potential difference is applied between the pixel electrodes and the counter-electrode. Thereby, a strong strain in the liquid crystal alignment strain is caused to occur in the thickness direction of the liquid crystal cell as well as in the in-plane direction of the liquid crystal cell. Thus, quick transition is made from the splay alignment to the bend alignment.

Also proposed is a technique (Jpn. Pat. Appln. KOKAI Publication No. 2003-280036) in which a transition nucleus pattern is composed of a pixel electrode and a near electrode which is located near the pixel electrode and is connected to a neighboring pixel electrode via a switching element. A potential difference, which corresponds to a pixel signal amplitude, is applied between these electrodes, and at the same time a potential difference is applied between the pixel electrode and the counter-electrode. Thereby, a strong strain in the liquid crystal alignment is caused to occur in the thickness direction of the liquid crystal cell as well as in the in-plane direction of the liquid crystal cell. Thus, while the potential variation due to capacitive coupling between the pixel electrode and neighboring wiring is being suppressed, quick transition is performed from the splay to the bend alignment. In the above techniques, the transition nucleus pattern is provided by overlapping the pixel electrode over the peripheral wiring electrodes, and the aperture ratio and contrast ratio can be kept high.

In the above-described KOKAI No. 2003-280036, in the transition nucleus pattern, the neighboring pixel electrodes are located close to each other, or the pixel electrode and the near electrode, which can apply a neighboring pixel potential, are located close to each other. Further, signal potentials of opposite polarities are applied to these electrodes, and the intensity of a transverse electric field is increased.

However, in the case where the electrodes are located close to each other in the pixel formation plane, it is necessary to consider the restriction by the definition of patterning. For example, in the case of ITO which is used as a transparent electrode material, at least a distance of several μm occurs between electrodes. In other words, in some cases, it is difficult to locate electrodes with less than a distance predetermined by the definition of patterning, and to obtain a desirably intense transverse electric field in the pixel formation plane.

Moreover, in order to realize high-speed transition, it is necessary to set, at predetermined timing, different potentials to the counter-electrode, each pixel electrode and the near electrode, and a complex driving control circuit is needed. Specifically, in the case of the pixel structure using a near electrode in the transition nucleus pattern, two switching elements are needed for one pixel, and it is difficult to simplify the device structure and the driving circuit structure.

Furthermore, the potential difference, which is applied between neighboring pixels or between a pixel and a near electrode, corresponds to a pixel signal amplitude (normally, 10 V or less). Consequently, in some cases, the electric field intensity in the in-plane direction of the liquid crystal cell becomes deficient, and the operation of the transition becomes unstable.

BRIEF SUMMARY OF THE INVENTION

The present invention has been made in consideration of the above-described problems, and an object of the invention is to provide a liquid crystal display device having a high aperture ratio and a high contrast ratio, wherein the initial transition of a liquid crystal material can be performed with simple structure.

Another object of the invention is to provide a liquid crystal display device which is free from a defect of the initial transition over the entirety of a display screen.

According to an aspect of the invention, there is provided a liquid crystal display device comprising: A liquid crystal display device comprising: a first substrate including a first insulating substrate, a first electrode located on the first insulating substrate, and a second electrode located between the first insulating substrate and the first electrode via an insulating underlayer interposed between the second electrode and the first electrode; a second substrate including a second insulating substrate and a third electrode on the second insulating substrate; a liquid crystal layer which is held between the first electrode and the third electrode and which exhibits a transition from a first state to a second state in an initializing process; and a voltage supply unit which supplies, in the initializing process, a first voltage to the first and the second electrodes and a second voltage, which is different from the first voltage, to the third electrode, wherein the first electrode includes a transition nucleus forming section which forms at least one of nuclei of the transition in the liquid crystal layer on the basis of the respective voltages supplied to the respective electrodes.

The present invention can provide a liquid crystal display device having a high aperture ratio and a high contrast ratio, wherein the initial transition of a liquid crystal material can be performed with simple structure.

The present invention can also provide a liquid crystal display device which is free from a defect of the initial transition over the entirety of a display screen.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
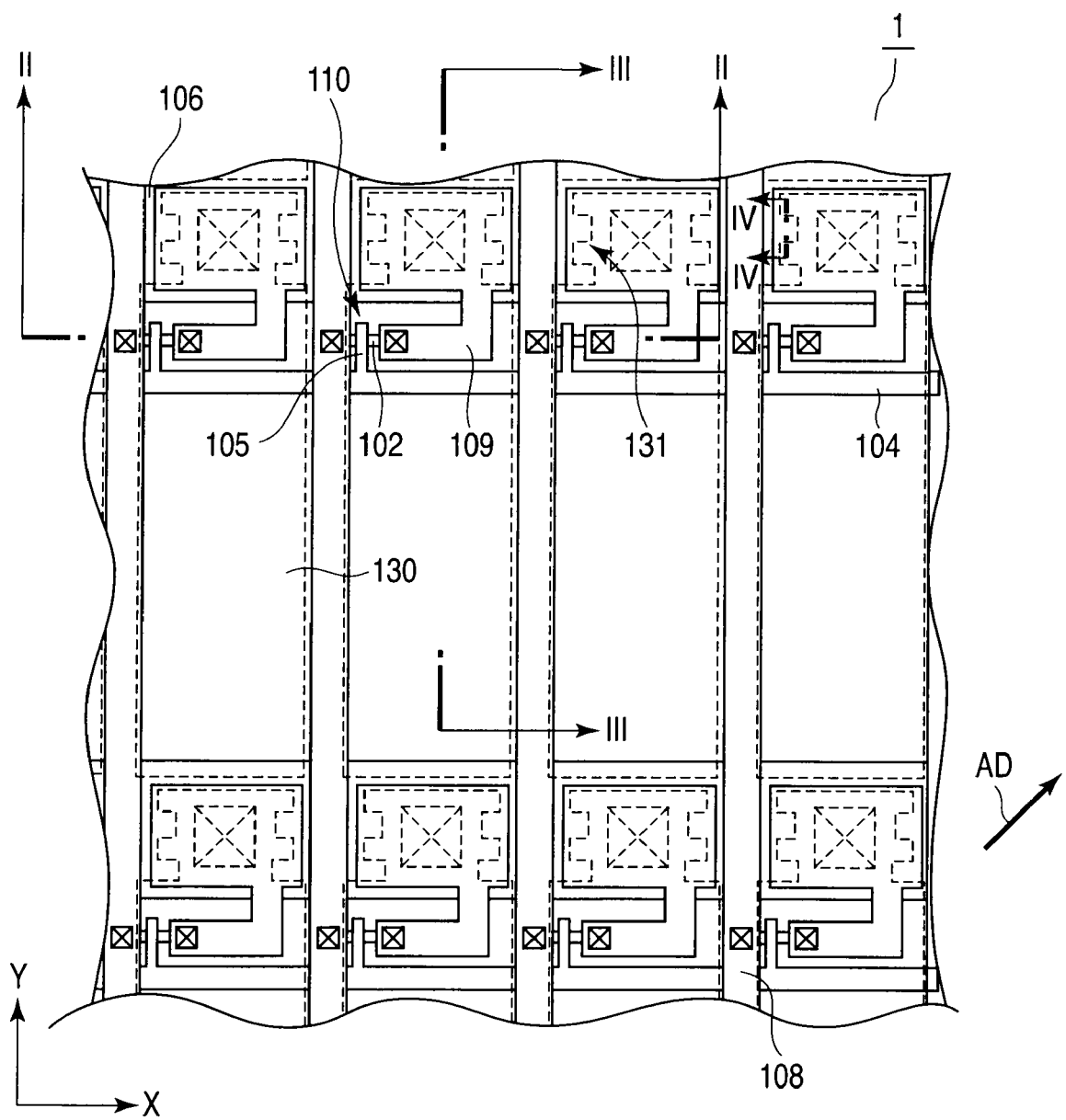
FIG. 1 is a plan view which schematically shows a liquid crystal display device according to a first embodiment of the present invention.

A liquid crystal display device according to an embodiment of the present invention will now be described in detail with reference to the accompanying drawings. Structural parts having the same or similar functions are denoted by like reference numerals throughout the drawings, and an overlapping description is omitted.

Figure 2:
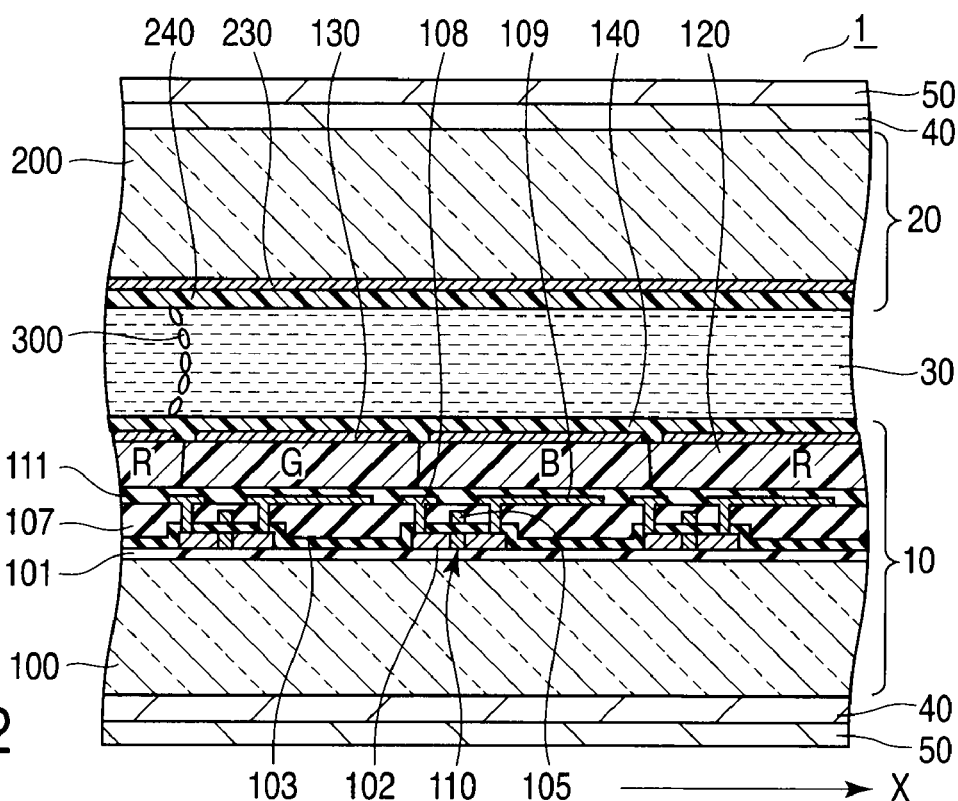
FIG. 2 shows an example of the cross section, taken along line II-II, of the liquid crystal display device shown in FIG. 1.
Figure 3:
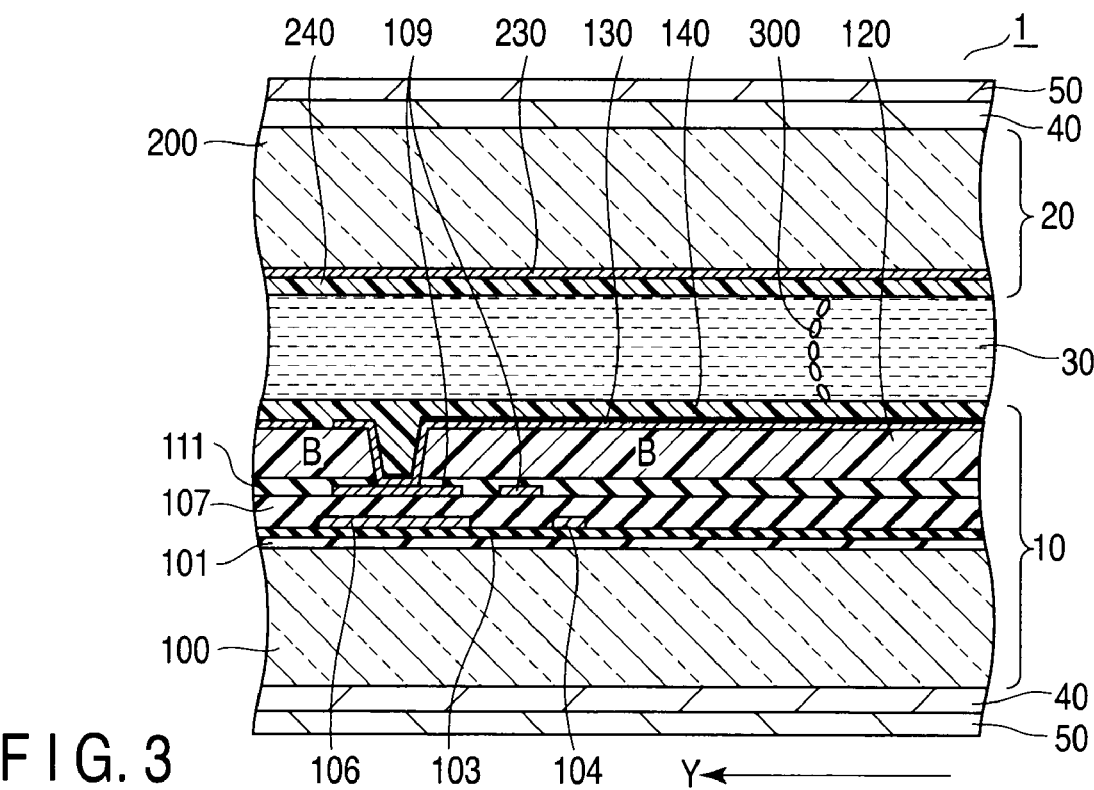
FIG. 3 shows an example of the cross section, taken along line III-III, of the liquid crystal display device shown in FIG. 1.

FIG. 1 is a plan view which schematically shows a liquid crystal display device according to a first embodiment of the invention. FIG. 2 is a cross-sectional view, taken along line II-II, of the liquid crystal display device shown in FIG. 1. FIG. 3 is a cross-sectional view, taken along line III-III, of the liquid crystal display device shown in FIG. 1. In FIG. 1, depiction of a color filter, which will be described later, is omitted.

The liquid crystal display device according to the present embodiment is an OCB-mode active matrix liquid crystal display device. This liquid crystal display device includes a liquid crystal display panel 1 and a backlight (not shown) which faces the liquid crystal display panel 1.

The liquid crystal display panel 1, as shown in FIG. 2 and FIG. 3, includes a back substrate 10 that is an array substrate, and a front substrate 20 that is a counter-substrate. A frame-shaped adhesive layer (not shown) is interposed between the back substrate 10 and the front substrate 20. The space, which is surrounded by the back substrate 10, front substrate 20 and adhesive layer, is filled with a liquid crystal layer 30 including a liquid crystal material. An optical compensation film 40 and a polarizer 50 are successively arranged on an outer surface of each of the back substrate 10 and front substrate 20.

The back substrate 10 includes a transparent insulating substrate 100 such as a glass substrate. An undercoat layer 101, which comprises, for instance, one of an $SiN_x$ layer and an $SiO_2$ layer, or an $SiN_x$ layer and an $SiO_2$ layer, is formed on the transparent insulating substrate 100.

A semiconductor layer 102, such as a polysilicon layer, in which a channel and a source/drain are formed, is arranged on the undercoat layer 101. The semiconductor layer 102 and undercoat layer 101 are coated with a gate insulation film 103. The gate insulation film 103 may be formed of, e.g. TEOS (tetraethoxyorthosilane).

Scanning lines 104 shown in FIG. 1 and FIG. 3, gate electrodes 105 shown in FIG. 1 and FIG. 2 and storage capacitance lines 106 shown in FIG. 1 and FIG. 3 are arranged in the same layer on the gate insulation film 103. The scanning lines 104 extend in a first direction, and are arranged in a second direction crossing the first direction.

In FIG. 1, the scanning lines 104 extend in an X direction which is a horizontal direction or a row direction, and are arranged in a Y direction which is a vertical direction or a column direction. A metallic material can be used as the material of the scanning lines 104. For example, MoW can be used as the material of the scanning lines 104.

As shown in FIG. 1, the gate electrode 105 is provided as a part of the scanning line 104. In addition, as shown in FIG. 2, the gate electrode 105 is opposed to the channel, which is formed in the semiconductor layer 102, via the gate insulation film 103. The gate electrode 105, gate insulation film 103 and semiconductor layer 102 constitute a thin-film transistor 110 as a switching element which is located near an intersection between the scanning line 104 and a signal line 108 (to be described later).

Although the thin-film transistor is the switching element 110 in the present embodiment, other switching elements, such as a diode or a MIM (Metal-Insulator-Metal), may be used as the switching elements.

The storage capacitance lines 106 extend in the X direction and are arranged in the Y direction crossing the X direction. In the liquid crystal display device according to the present embodiment, one storage capacitance line 106 is formed in association with each scanning line 104. The storage capacitance line 106 can be formed, for example, in the same fabrication step as the scanning line 104.

As shown in FIG. 2 and FIG. 3, the gate insulation film 103, scanning line 104, gate electrode 105 and storage capacitance line 106 are coated with an interlayer insulation film 107. For example, one of an $SiN_x$ layer and an $SiO_2$ layer, or an $SiN_x$ layer and an $SiO_2$ layer, can be used for the interlayer insulation film 107.

As shown in FIG. 1 and FIG. 2, signal lines 108 and drain electrodes 109 are arranged on the interlayer insulation film 107. As shown in FIG. 1, the signal lines 108 extend in the Y direction and are arranged in the X direction. A metallic material can be used as the material of the signal line 108. For example, the signal line 108 may be configured to adopt a three-layer structure of a Mo layer, an Al—Nd layer and a Mo layer.

In the liquid crystal display device according to the present embodiment, as shown in FIG. 2, the signal line 108 is connected to a source electrode of the thin-film transistor 110 via a contact hole which is provided in the interlayer insulation film 107. Alternatively, the signal line 108 is integrally formed with the source electrode.

As shown in FIG. 1 and FIG. 2, one end of the drain electrode 109 is connected to the semiconductor layer 102 of the thin-film transistor 110 via a contact hole which is provided in the interlayer insulation film 107. As shown in FIG. 1 and FIG. 3, the other end of the drain electrode 109 is opposed to the storage capacitance line 106 via the interlayer insulation film 107. Specifically, in the liquid crystal display device according to the present embodiment, the drain electrode 109, storage capacitance line 106 and interlayer insulation film 107 constitute a capacitor. For example, the same material as the material of the signal line 108 can be used for the drain electrode 109.

The interlayer insulation film 107, signal line 108 and drain electrode 109 are coated with an insulating underlayer. The insulating underlayer has a function of surface smoothing so that quick transition can be realized. In the liquid crystal display device according to the present embodiment, for example, the insulating underlayer is composed of a passivation film 111 and a color filter 120. The insulating underlayer may be composed of the color filter 120 alone, with the passivation film 111 being omitted. The color filter 120 may be replaced with a transparent resin.

As shown in FIG. 2 and FIG. 3, the passivation film 111 covers the interlayer insulation film 107, signal line 108 and drain electrode 109. For instance, $SiN_x$ can be used for the passivation film 111.

The color filter 120 includes a plurality of color layers having mutually different absorption spectra, for instance, a green color layer G, a blue color layer B and a red color layer R. In the liquid crystal display device according to the present embodiment, the color layers G, B and R have substantially rectangular shapes extending in the Y direction, as shown in FIG. 3, and are arranged in the X direction, as shown in FIG. 2, thus forming a stripe pattern.

As shown in FIG. 2, the color layers G, B and R are arranged such that boundaries therebetween overlap the signal lines 108. For example, a mixture including a transparent resin, a dye and a pigment, or a mixture including a transparent resin, and a dye or a pigment, may be used for the color layer G, B, R. In FIGS. 2 and 3, the color filter 120 is provided on the back substrate 10 side. Alternatively, the color filter 120 may be provided on the front substrate 20 side.

As shown in FIG. 1 to FIG. 3, pixel electrodes 130, which are formed of a transparent electrical conductor such as ITO (indium tin oxide), are arranged on the color filter 120 in association with the respective thin-film transistors 110. As shown in FIG. 1 to FIG. 3, the pixel electrodes 130 are electrically connected to the drain electrodes 109 via contact holes provided in the passivation film 111 and color filter 120.

The pixel electrodes 130, if formed as reflective pixel electrodes, may be formed of a metallic material such as aluminum.

The pixel electrodes 130 and color filters 120 are coated with an alignment film 140. For example, a resin such as polyimide can be used as the material of the alignment film 140. The alignment film 140 is subjected to alignment treatment. In the liquid crystal display device according to the present embodiment, such a method as to define the direction of raising liquid crystal molecules 300 on film surfaces, for instance, rubbing treatment, is selected as the alignment treatment. In the liquid crystal display device according to the present embodiment, in the rubbing treatment, the direction, which is indicated by an arrow in FIG. 1, is defined as a rubbing direction AD.

In the liquid crystal display device according to the present embodiment, the pixel electrode 130 has a transition nucleus forming section including the transition nucleus pattern 131. Specifically, of end sides of the pixel electrode 130, a part thereof, which overlaps the drain electrode 109 and extends substantially in parallel to the Y direction, is provided with a plurality of transition nucleus pattern 131. The transition nucleus pattern 131 is a bend pattern with protrusions and/or recesses provided on an end side of the pixel electrode 130.

The pattern shape of the transition nucleus pattern 131 is, for example, a bend pattern shape crossing the rubbing direction AD. The pattern shape may be a combination of different shape patterns, or a chained pattern. FIG. 1 shows, for example, the transition nucleus pattern 131 having a successive rectangular pattern comprising recess portions formed of end sides crossing the rubbing direction AD at about 45°.

As shown in FIG. 1, the alignment film 140, 240 is subjected to rubbing treatment in the direction AD which is at about 45° to the X direction and the Y direction. The transition nucleus pattern 131 includes recess portions each being formed of an end side portion extending in the X direction and an end side portion extending in the Y direction.

In the liquid crystal display device according to the present embodiment, the transition nucleus pattern 131 is formed such that a width W in the Y direction between the end sides extending in the X direction is ½ or more of a thickness d1 of the liquid crystal layer 30. In addition, a thickness d2 of the insulating underlayer is set to be ⅕ or more of the thickness d1 of the liquid crystal layer 30. By setting the thickness d2 of the insulating underlayer at ⅕ or more of the thickness d1 of the liquid crystal layer 30, and preferably at ¼ or more of the thickness d1, it becomes possible to sufficiently apply an effective transverse electric field to the liquid crystal layer 30 near the transition nucleus pattern 131, even if the same voltage is supplied to the upper and lower electrodes which are stacked via the insulating underlayer. In addition, a transition nucleus can surely be formed by setting the width W in the Y direction between the end sides extending in the X direction at ½ or more of the thickness d1 of the liquid crystal layer 30. The front substrate 20, as shown in FIG. 2 and FIG. 3, includes a transparent insulating substrate 200 such as a glass substrate. The transparent insulating substrate 200 faces the surface of the back substrate 10, on which the alignment film 140 is formed. A common electrode 230, which functions as a counter-electrode, is formed on that surface of the transparent insulating substrate 200, which is opposed to the back substrate 10. A transparent electrical conductor, such as ITO, can be used for the common electrode 230.

The common electrode 230 is coated with an alignment film 240. The alignment film 240 is spaced apart from the alignment film 140 by a spacer (not shown). A resin, such as polyimide, can be used as the material of the alignment film

240. The alignment film 240, like the alignment film 140, is subjected to alignment treatment such as rubbing.

In the liquid crystal display device according to the present embodiment, rubbing treatment, for instance, is selected as the alignment treatment of the alignment film 240, like the alignment film 140. When the rubbing treatment is performed, the direction, which is indicated by the arrow AD in FIG. 1, is defined as the rubbing direction.

A frame-shaped adhesive layer (not shown) is interposed between the back substrate 10 and the front substrate 20. In addition, particulate spacers (not shown) are provided inside the frame-shaped adhesive layer between the back substrate 10 and the front substrate 20. Alternatively, columnar spacers (not shown) are formed on at least one of opposed surfaces of the back substrate 10 and the front substrate 20. These spacers function to keep constant the thickness of the space which is surrounded by the back substrate 10, front substrate 20 and adhesive layer.

The liquid crystal layer 30 includes a liquid crystal material having a positive dielectric anisotropy and a positive-birefringence. The liquid crystal material creates a bend alignment during a period in which a voltage is applied between the pixel electrodes 130 and the common electrode 230. Bright and dark states are switched by changing the absolute value of a voltage, which is applied between the pixel electrodes 130 and the common electrode 230, between a first value, which is typically greater than zero, and a second value which is greater than the first value. In the liquid crystal display device according to the present embodiment, there is a case in which the first value may be zero. In the description below, a state in which the absolute value of the voltage, which is applied between the pixel electrodes 130 and the common electrode 230, is set at the first value, is referred to as "off-state", and a state in which the absolute value of the voltage, which is applied between the pixel electrodes 130 and the common electrode 230, is set at the second value, is referred to as "on-state".

Each of FIG. 2 and FIG. 3 shows a projection image at a time when the axis of the liquid crystal molecules 300, which are bend-aligned in the off-state, is set at 45° to the sheet surface of FIG. 2 and FIG. 3.

The optical compensation film 40 is, for example, a biaxial film. The optical compensation film 40 includes, for example, an optical anisotropic layer in which a uniaxial compound with a negative birefringence, e.g. a discotic liquid crystal compound, is hybrid-aligned.

The optical axis of the uniaxial compound included in the optical compensation film 40 covering the transparent insulating substrate 100 is, for example, substantially parallel to the optical axis of the liquid crystal molecules 300 in the on-state, which are positioned near the back substrate 10. The optical axis of the uniaxial compound included in the optical compensation film 40 covering the transparent insulating substrate 100 is, substantially parallel to the optical axis of the liquid crystal molecules 300 in the on-state, which are positioned between the back substrate 10 and the front substrate 20.

The optical axis of the uniaxial compound included in the optical compensation film 40 covering the transparent insulating substrate 200 is, for example, substantially parallel to the optical axis of the liquid crystal molecules 300 in the on-state, which are positioned near the front substrate 20. The optical axis of the uniaxial compound included in the optical compensation film 40 covering the transparent insulating substrate 200 is, substantially parallel to the optical axis of the liquid crystal molecules 300 in the on-state, which are positioned between the back substrate 10 and the front substrate 20. The sum of retardations of the optical compensation films 40 is, for example, substantially equal to the retardation of the liquid crystal layer 30 in the on-state.

The polarizers 50, which are attached to the back substrate 10 and front substrate 20, are arranged, for example, such that their transmission axes are substantially perpendicular to each other. Each polarizer 50 is arranged, for example, such that the transmission axis thereof is set at an angle of about 45° to the X direction and Y direction.

The scanning lines 104 are connected to a scanning line driving circuit which successively outputs scanning pulses during every 1 vertical scan periods. The signal lines 108 are connected to a signal line driving circuit which outputs video signals in every 1 horizontal scanning periods. Further, the common electrode 230 is connected to a common electrode driving circuit. In addition, the scanning line driving circuit, signal line driving circuit and common electrode driving circuit are connected to a liquid crystal controller, and their operation timing is controlled.

A backlight (not shown) illuminates the back substrate 10 of the liquid crystal display panel 1. The turn-on timing of the backlight is controlled by the liquid crystal controller.

The above description is directed to the structure in which the liquid crystal display panel 1 is driven in normally white mode. Alternatively, the liquid crystal display panel 1 may be designed for normally black driving mode. In addition, although the above-described embodiment adopts the structure for compensating the on-state, the embodiment may adopt a structure for compensating the off-state.

In the above-described liquid crystal display device, the splay alignment is created in the liquid crystal material in the initial state prior to power-on. Thus, when the display device is activated, it is necessary to perform a process for the transition of the liquid crystal material from the splay alignment to the bend alignment, that is, an initializing process.

In order to quick and uniform transition of the alignment state from the splay alignment to the bend alignment over the entire display area, it is effective to perform the following operation at the same time as performing the operation of applying a voltage between the pixel electrodes 130 and the common electrode 230 and raising the liquid crystal molecules 300 in the thickness direction of the liquid crystal display panel 1. Specifically, it is effective to perform, at the same time as this operation, the operation of generating a transverse electric field crossing the rubbing direction AD in the transition nucleus pattern 131 and forming, at close positions, twist strains in different direction of rotation in the in-plane direction of the substrate, thereby concentrating strain energy and facilitating occurrence of transition.

Hence, in order to achieve high-speed transition, it is necessary to generate a transverse electric field which is intense enough to cause twist strains in the transition nucleus pattern 131.

The inventors have found that in the case of the structure of the transition nucleus pattern 131 of the liquid crystal display device according to the present embodiment, even if the pixel electrode 130 and the immediately underlying electrode (drain electrode 109), which is stacked via the insulation film, have the same potential, a transverse electric field can be applied to the liquid crystal molecules 300, and the transverse electric field has a sufficient intensity. The reason is as follows.

Figure 4:
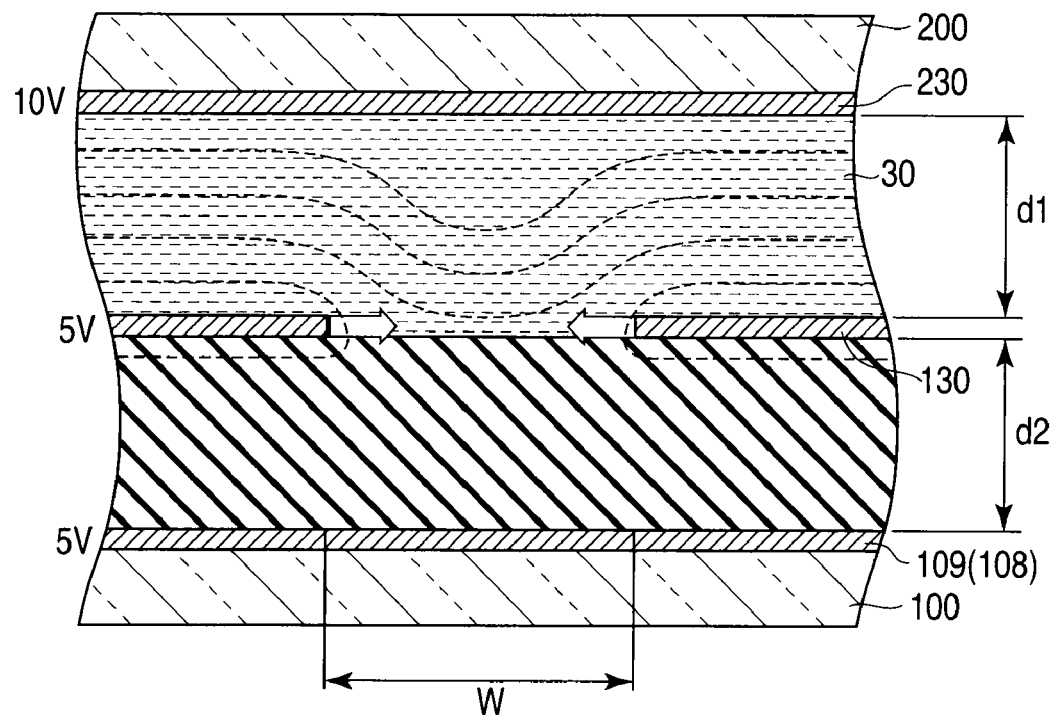
FIG. 4 shows an example of the cross section, taken along line IV-IV, of the liquid crystal display device shown in FIG. 1.
Figure 5:
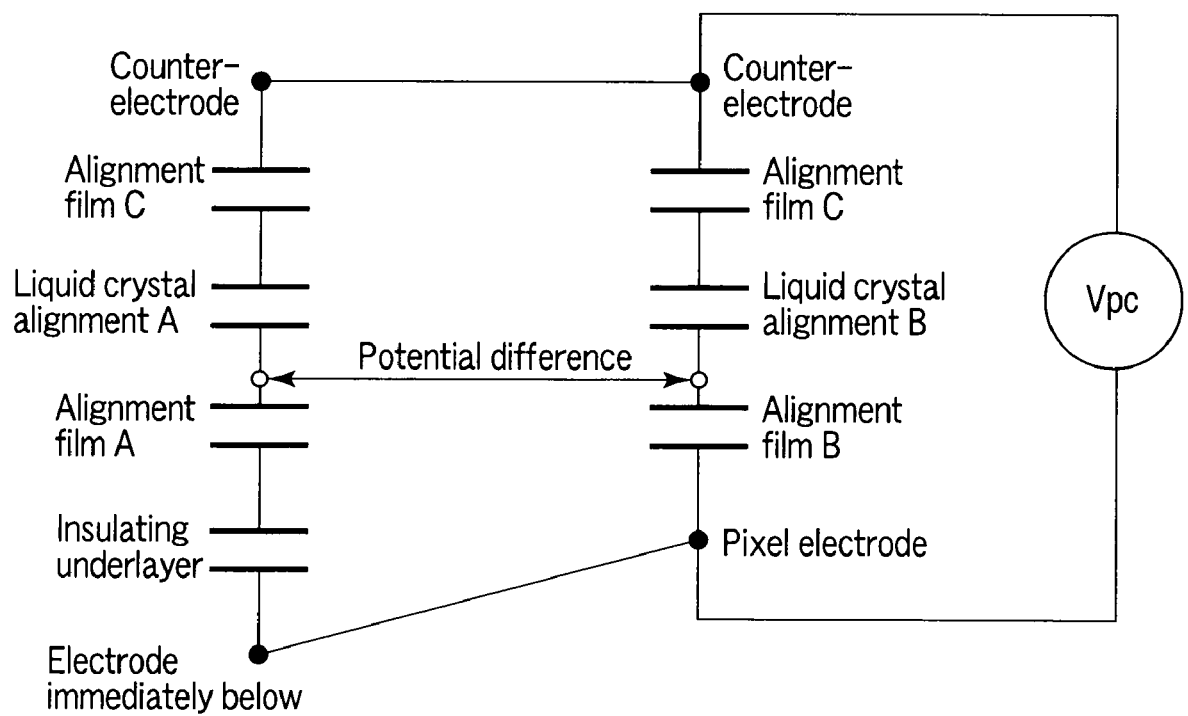
FIG. 5 is a view for explaining a transverse electric field which occurs near a transition nucleus pattern in the liquid crystal display device shown in FIG. 1.

Now consider a vertical stacked structure of insulative (dielectric) members in the vicinity of the transition nucleus pattern 131. As shown in FIG. 4 and FIG. 5, the difference between the upper side of the pixel electrode 130 and the upper side of the adjacent drain electrode 109 is whether there is an insulating underlayer, is present or absent. Thus, since the vertical electric field intensity is different between the upper side of the pixel electrode 130 and the upper side of the adjacent drain electrode 109, a transverse electric field is applied to the liquid crystal molecules 300 along the shape of the transition nucleus pattern 131, and the alignment state becomes different.

To be more specific, as shown in FIG. 4 and FIG. 5, the voltage values, which are distributed when the respective layer members are regarded as capacitance components, are different, and a potential difference occurs between the upper side of the pixel electrode 130 and the upper side of the drain electrode 109 at the same height, for example, at the height of the lower-side interface of the liquid crystal layer 30. If this potential difference is a response threshold voltage of the liquid crystal layer 30 or above, a twist strain can surely be formed.

In the liquid crystal display device according to the present embodiment, when initialization is performed, the pixel electrode 130 and the drain electrode 109 have the same potential. At this time, the potential difference between the pixel electrode 130 and the common electrode 230 becomes equal to the potential difference between the drain electrode 109 and the common electrode 230.

Accordingly, as shown in FIG. 4 and FIG. 5, a potential difference occurs between the upper side of the pixel electrode 130 and the upper side of the drain electrode 109 at the height of the lower-side interface of the liquid crystal layer 30. As a result, a transverse electric field occurs in a direction substantially perpendicular to the end side of the transition nucleus pattern 131. In the present specification, the vertical direction is a direction (the thickness direction of the liquid crystal display panel 1) which is substantially perpendicular to the substrate surfaces of the back substrate 10 and front substrate 20, and the transverse direction is a direction which is substantially parallel to the substrate surfaces of the back substrate 10 and front substrate 20.

As has been described above, according to the structure of the liquid crystal display device of the present embodiment, the transition nucleus pattern 131 can be formed between the pixel electrode 130 and the drain electrode 109 which, although included in the stacked structure, has conventionally been considered non-usable since a potential difference cannot be set.

Specifically, since the drain electrode 109 is, in usual cases, formed of a light-blocking metallic material, the area where the drain electrode 109 is arranged cannot be used for display. Thus, even if the transition nucleus pattern 131 is newly provided on the area of the pixel electrode 130, which overlaps the drain electrode 109, the aperture ratio or contrast ratio are not decreased.

Therefore, the present embodiment can provide a liquid crystal display device having a high aperture ratio and a high contrast ratio, wherein the transition of a liquid crystal material can be performed with simple structure. In addition, this embodiment can provide a liquid crystal display device which is free from a defect of initial transition over the entirety of a display screen.

In particular, the transition nucleus pattern 131 is formed such that the width W in the Y direction between the end sides thereof extending in the X direction is ½ or more of the thickness d1 of the liquid crystal layer 30. In addition, the thickness d2 of the insulating underlayer is set to be ⅕ or more of the thickness d1 of the liquid crystal layer 30, preferably ¼ or more of the thickness d1. Thereby, it becomes possible to sufficiently apply an effective transverse electric field, and to surely form a transition nucleus.

In the liquid crystal display device according to the present embodiment, as shown in FIG. 3, the contact hole, which connects the pixel electrode 130 and the drain electrode 109, is sufficiently planarized so as not to form a recess on the surface of the back substrate 10. By performing planarization so as not to form a recess on the back substrate 10 in the vicinity of the transition nucleus pattern 131, quicker transition can be realized without hindering spreading of the bend alignment starting from the transition nucleus.

Figure 6:
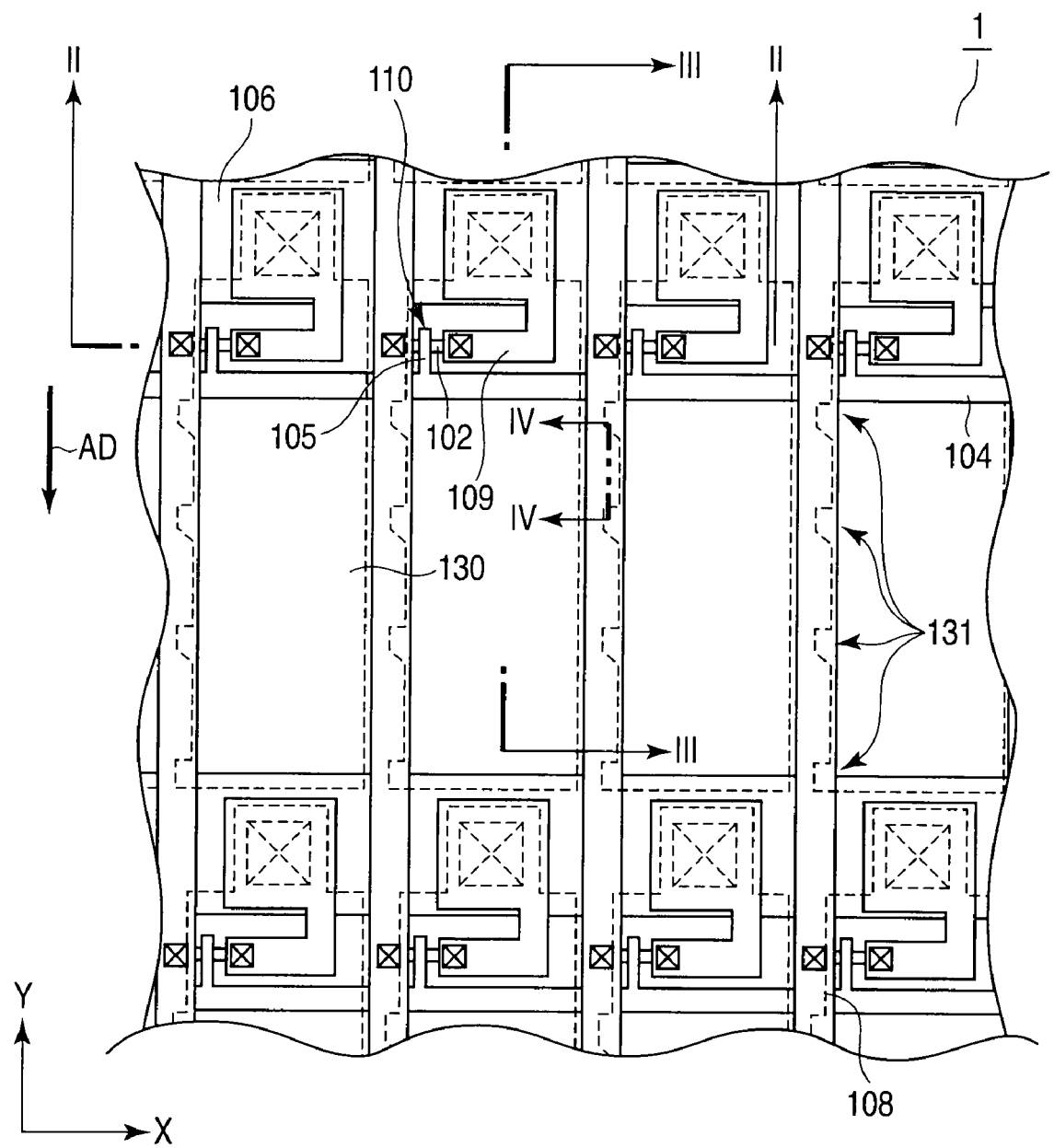
FIG. 6 is a plan view which schematically shows a liquid crystal display device according to a second embodiment of the present invention.

Next, a description is given of a liquid crystal display device according to a second embodiment of the present invention. FIG. 6 schematically shows an example of the liquid crystal display device according to the second embodiment. As shown in FIG. 6, the liquid crystal display device according to the second embodiment differs from the liquid crystal display device according to the first embodiment in that the rubbing direction AD of the alignment film 140, 240 is substantially parallel to the Y direction, and that a transition nucleus pattern 131 is formed on an end side of the pixel electrode 130, which overlaps the signal line 108 via the insulating underlayer.

In the liquid crystal display device according to the present second embodiment, like the liquid crystal display device according to the first embodiment, the pixel electrode 130 includes a transition nucleus forming section including the transition nucleus pattern 131. The transition nucleus pattern 131 is a pattern as shown in FIG. 6. Specifically, the transition nucleus pattern 131 is a recess-and-protrusion bend pattern in a direction substantially parallel to the substrate surface, which is composed of two end sides extending in a direction crossing the rubbing direction AD and one end side extending in a direction substantially parallel to the rubbing direction AD. The transition nucleus pattern 131 overlaps the signal line 108 via the insulating underlayer.

Consideration is now given to a stacked structure of insulative (dielectric) members in the vertical direction (the thickness direction of the liquid crystal display panel 1) in the vicinity of the transition nucleus pattern 131. The difference between the upper side of the pixel electrode 130 and the upper side of the adjacent signal line 108 is whether there is an insulating underlayer, is present or absent. Further, there is a possible difference in thickness of the alignment film 140 and the liquid crystal layer 30. Besides, since the vertical electric field intensity is different between the upper side of the pixel electrode 130 and the upper side of the adjacent signal line 108, the alignment state of the liquid crystal molecules 300 differs. Hence, an average dielectric constant differs.

Thus, as shown in FIG. 5, like the case of the liquid crystal display device of the first embodiment, the voltage values, which are distributed when the respective layer members are regarded as capacitance components, are different. Specifically, as shown in FIG. 4, a potential difference occurs between the upper side of the pixel electrode 130 and the upper side of the adjacent signal line 108 at the same height, for example, at the height of the lower-side interface of the liquid crystal layer 30. If this potential difference is a response threshold voltage of the liquid crystal layer 30 or above, a twist strain can surely be formed, as in the above-described case.

This means that in the initializing process, the transition nucleus can be formed even if a predetermined video signal is continuously supplied to the signal line 108 during one vertical scanning period, that is, even if the pixel electrode 130 and the signal line 108 have the same potential. In other words, in the initializing process, there is no need to execute such control as to apply an alternating voltage during one vertical scanning period so as to intentionally impart a potential difference between the pixel electrode 130 and the signal line 108. Therefore, the structures of the signal line driving circuit and the liquid controller can be simplified.

Furthermore, since the signal line 108 is, in usual cases, formed of a light-blocking metallic material, the area where the signal line 108 is arranged cannot be used for display. Thus, even if the transition nucleus pattern 131 is newly provided on the area of the pixel electrode 130, which overlaps the signal line 108, the aperture ratio or contrast ratio are not decreased.

Therefore, the present embodiment, like the first embodiment, can provide a liquid crystal display device having a high aperture ratio and a high contrast ratio, wherein the transition of a liquid crystal material can be performed with simple structure.

Hereinafter, examples of the liquid crystal display devices according to the above-described embodiments will be described.

FIRST EXAMPLE

In a first example of the invention, the OCB mode liquid crystal display device shown in FIG. 1 to FIG. 3 was fabricated by a method which is described below. In the first example, the optical compensation film 40 is not formed on the outer surface of the back substrate 10. The optical compensation film 40 is formed only on the outer surface of the front substrate 20.

To start with, a glass substrate 100 with a thickness of 0.5 mm was prepared as a transparent insulating substrate. The stacked structure from the undercoat layer 101 to the pixel electrode 130 was formed on the glass substrate 100 by film formation and patterning. When the pixel electrode 130 was patterned, the transition nucleus pattern 131 was formed, as shown in FIG. 1. The transition nucleus pattern 131 is configured to have a recess portion which is recessed on the inside of the pixel electrode from an end side, which is one of end sides overlap the drain electrode 109 and which extends in the Y direction.

The width W in the Y direction between the end sides of the transition nucleus pattern 131, which extend in the X direction, is ½ or more of the thickness d1 of the liquid crystal layer 30. In addition, the thickness d2 of the insulating underlayer is set at ¼ of the thickness d1 of the liquid crystal layer 30, which is greater than ⅕ of the thickness d1. Specifically, in the liquid crystal display device according to this example, the thickness d1 of the liquid crystal layer 30 is about 4 μm, the width W is about 2 μm, and the thickness d2 of the insulating underlayer is about 1 μm.

Further, a glass substrate 200 with a thickness of 0.5 mm was prepared as a transparent insulating substrate, and a common electrode 230 was formed on the glass substrate 200. In this example, the pixel electrode 130 was formed in a substantially rectangular shape, the pitch in the X direction of the arrangement of pixel electrodes 130 was set at 82 μm, and the pitch in the Y direction of the arrangement of pixel electrodes 130 was set at 246 μm.

Subsequently, Optomer AL3456 (manufactured by JSR Corporation) was spin-coated on each of the pixel electrode 130 and common electrode 230, and polyimide resin layers with a thickness of 0.1 μm were formed. Each polyimide resin layer was subjected to rubbing treatment in the rubbing direction AD shown in FIG. 1, that is, in a direction intersecting at 45° with the direction of extension of the signal line 108. Thus, alignment films 140 and 240 were formed.

In the following step, a thermosetting adhesive was dispensed on the major surface of the back substrate 10 in a manner to surround the alignment film 140. A frame, which is formed by the adhesive layer, was provided with an opening (not shown) which is used as a liquid crystal injection hole. After the adhesive was provisionally dried, a silver paste was dispensed on a transfer pad (not shown).

Subsequently, particulate spacers each with a diameter of 4.3 μm were dispersed over the alignment film 240. In this example, particulate spacers were dispersed as spacers. Alternatively, columnar spacers may be formed of a photosensitive resin. The columnar spacers may be formed on the back substrate 10 or the front substrate 20. Further, the columnar spacers may be formed integral with the back substrate 10 or front substrate 20, and the alignment films may be formed thereon.

Thereafter, the back substrate 10 and front substrate 20 were attached such that the alignment film 140 faces alignment film 240 and the rubbing direction AD of the alignment film 140 agrees with that of the alignment film 240, and the back substrate 10 and front substrate 20, which were attached, were heated.

Next, a nematic liquid crystal compound with a positive dielectric anisotropy was injected by a dip method. Then, an ultraviolet-curing resin was dispensed on the liquid crystal injection hole, and the ultraviolet-curing resin was irradiated with ultraviolet. Further, a polarizer 50 was attached to the outer surface of the back substrate 10, and an optical compensation film 40 and a polarizer 50 were successively attached to the outer surface of the front substrate 20.

The optical compensation film 40, which was used in this example, includes an optical anisotropic layer in which a discotic liquid crystal compound is bend-aligned such that its optical axis varies in a plane perpendicular to the X direction. The direction of a maximum principal normal velocity of the optical compensation film 40 is substantially parallel to the thickness direction of the optical compensation film 40. The direction of a minimum principal normal velocity of the optical compensation film 40 is substantially parallel to the X direction, and the direction of other principal normal velocity of the optical compensation film 40 is substantially parallel to the Y direction.

The thus obtained liquid crystal display panel 1 was combined with a scanning line driving circuit, a signal line driving circuit, a common electrode driving circuit, a liquid crystal controller and a backlight unit, which are not shown, and the liquid crystal display device shown in FIG. 1 to FIG. 3 was completely fabricated.

In the state in which the liquid crystal display device was kept at room temperature and the backlight was turned on, scanning pulses were successively applied to the scanning lines 104, and a voltage with an amplitude of 5 V (±2.5 V) with reference to 2.5 V, which has an alternately reversed polarity in every 1 vertical scanning period, was applied to the signal lines 108. In addition, a voltage with an amplitude of 30 V (±15 V) with reference to 2.5 V, which has an opposite polarity to the voltage of signal lines 108, was applied alternately to the common electrode 230 in every 1 vertical scanning period. As a result, an alternating voltage of ±17.5 V was applied between the pixel electrode 130 and the common electrode 230.

Each pixel of the above-described liquid crystal display device was observed under the microscope. As a result, it was found that the average value of the time that was needed until the transition of the liquid crystal material from the splay alignment to the bend alignment in one pixel was 0.08 second. The average time that was needed until completion of the transition over the entire screen, which was obtained by repeated measurements, was 0.15 second. The reason why this time is needed for transition over the entire screen is that a distribution of pretilt is present in the panel plane.

In the above-described example, the thickness d2 of the insulating underlayer was 1 µm. When the thickness d2 of the insulating underlayer was set at 3 µm, the average value of the time that was needed until the transition of the liquid crystal material from the splay alignment to the bend alignment was 0.1 second. The average time that was needed until completion of the transition over the entire screen, which was obtained by repeated measurements, was 0.2 second.

In the above-described example, in order to confirm the transition, the initializing process was carried out in the state in which the backlight was turned on. Actually, it is preferable to turn off the backlight in the initializing process.

In addition, since the initializing process time is sensitively affected by ambient temperatures, it is desirable to determine the initializing process time on the basis of the detection result of a temperature sensor.

In the above-described embodiment, at the time of the initializing process, scanning pulses are successively output to the scanning lines 104. Alternatively, scanning pulses may be output at the same time to a plurality of scanning lines 104, or scanning pulses may be output at the same time to all scanning lines 104.

SECOND EXAMPLE

Next, a liquid crystal display device according to a second example of the invention is described. By the same method as described in the first example, the liquid crystal display device shown in FIG. 2, FIG. 3 and FIG. 6 was fabricated. Specifically, in the liquid crystal display device according to the second example, as shown in FIG. 6, the pixel electrode 130 was provided with the transition nucleus pattern 131 in a manner to overlap the signal line 108 via the switching element 110. Further, the alignment films 140 and 240 were subjected to rubbing treatment in the rubbing direction AD shown in FIG. 6, that is, in the direction of extension of the signal line 108.

The transition nucleus pattern 131 is composed of a plurality of protrusion portions which protrude from the pixel electrode 103 in a manner to overlap the associated signal line 108 and to arrange along the associated signal line 108. Each of the protrusion portions is composed of an end side extending perpendicular to the rubbing direction AD, an end side extending in parallel to the rubbing direction AD, and an end side crossing the rubbing direction AD at about 45°.

The width W in the Y direction between the end sides of the transition nucleus pattern 131, which extend in the X direction, is ½ or more of the thickness d1 of the liquid crystal layer 30. In addition, the thickness d2 of the insulating underlayer is set at ¼ or more of the thickness d1 of the liquid crystal layer 30.

In the present example, like the above-described example, scanning pulses were successively applied to the scanning lines 104, and a voltage with an amplitude of 5 V (±2.5 V) with reference to 2.5 V, which has an alternately reversed polarity in every frame, was applied to the signal lines 108. In addition, a voltage with an amplitude of 30 V (±15 V) with reference to 2.5 V, which has an opposite polarity to the voltage of signal lines 108, was applied alternately to the common electrode 230 in every frame.

In the present example, the thickness d1 of the liquid crystal layer 30 was set at 4 µm. The thickness d2 of the insulating underlayer was set at 1 µm, and the width W in the Y direction between the end sides of the transition nucleus pattern 131, which extend in the X direction, was set at 2 µm.

As regards this liquid crystal display device, the time that was needed until completion of the transition from the splay alignment to the bend alignment was measured by the same method as in the first example. As a result, the average time for the transition in one pixel was 0.1 second. The average time that was needed for completion of the transition over the entire screen was 0.2 second.

In the above-described embodiment, the transition nucleus pattern 131 was composed of protrusion portions. Alternatively, the transition nucleus pattern 131 may be composed of recess portions, as in the first example. In usual cases, it is desirable for the display operation to minimize the overlap area between the pixel electrode 130 and the signal line 108, thereby reducing parasitic capacitance. Thus, the transition nucleus pattern 131 should preferably be composed of protrusion portions.

THIRD EXAMPLE

Figure 7:
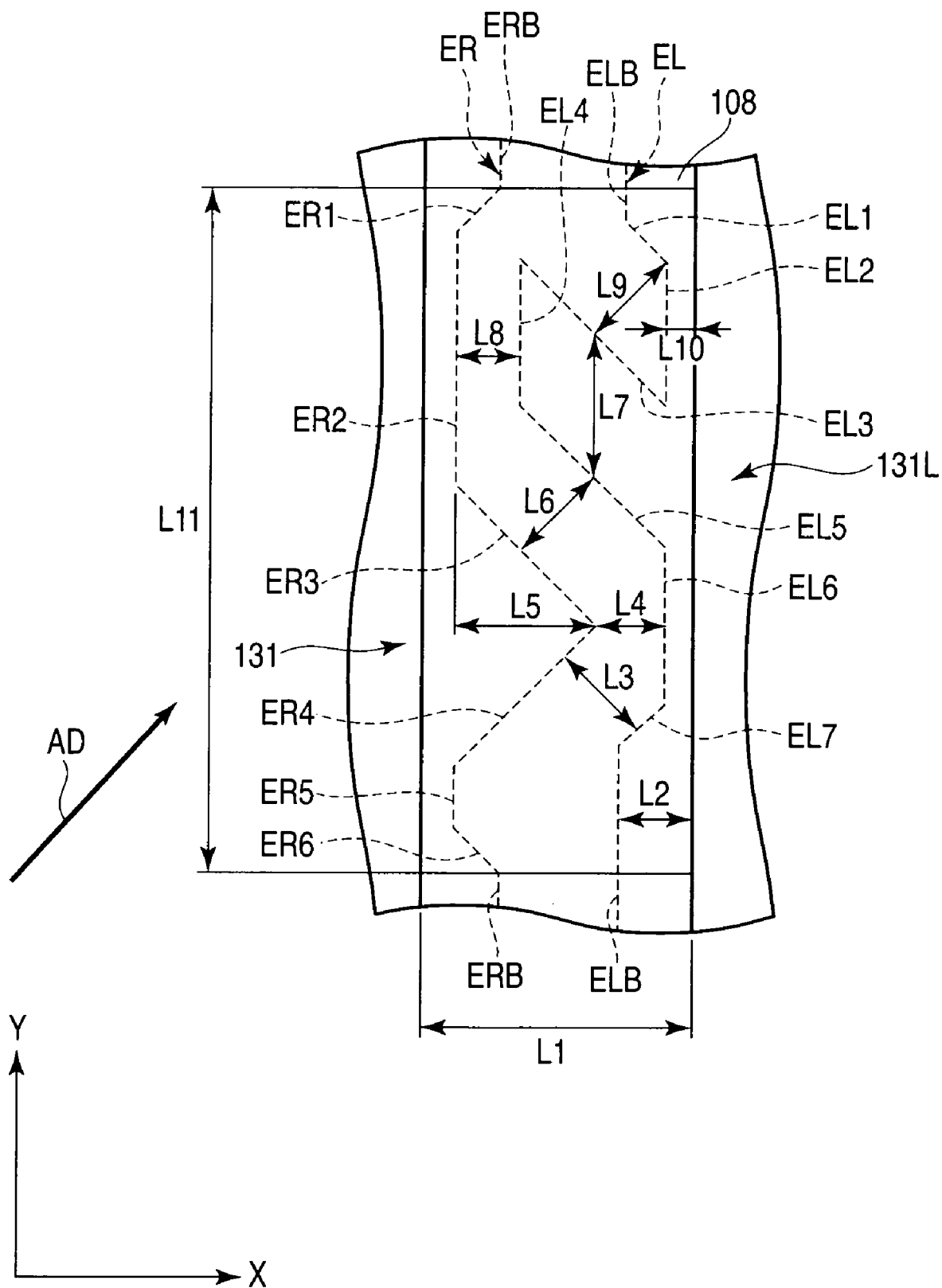
FIG. 7 is a view for describing another example of the liquid crystal display device according to the second embodiment of the invention.

As a liquid crystal display device according to a third example of the invention, a liquid crystal display device shown in FIG. 2, FIG. 3 and FIG. 7 was fabricated in the same manner as in the second example, except for the points which are described below. In the liquid crystal display device according to the third example, when the pixel electrodes 130 are patterned, transition nucleus patterns 131, as shown in FIG. 7, were formed. In the liquid crystal display device according to this example, the alignment films 140 and 240 were subjected to rubbing treatment in the rubbing direction AD shown in FIG. 7. The rubbing direction AD is a direction at about 45° to the direction (Y direction) in which the signal line 108 extends.

As shown in FIG. 7, the transition nucleus pattern 131 is a set of patterns provided on an end side ER, EL, of the pixel electrode 130, which overlaps the signal line 108. Specifically, in the liquid crystal display device according to this example, the transition nucleus pattern 131 is formed on the end side ER, EL, of the substantially rectangular pixel electrode 130, which extends in the Y direction.

FIG. 7 shows parts of mutually opposed end sides ER and EL of the neighboring pixel electrodes 130. The end side ER overlaps the neighboring signal line 108, and includes end sides ERB which extend substantially parallel to the signal line 108 from both ends of the transition nucleus pattern 131. The transition nucleus pattern 131 includes an end side ER2 which is recessed more on the inside of the pixel electrode 130 than the end side ERB, and extends substantially parallel to the signal line 108. One end of the end side ER2 is connected to an end side ER1 which extends substantially parallel to the rubbing direction AD. The end side ER2 and the end side ERB are connected by the end side ER1.

The other end of the end side ER2 is connected to one end of an end side ER3. The end side ER3 extends in a direction substantially perpendicular to the rubbing direction AD, and protrudes beyond the center of the width of the signal line 108 in the X direction. As described above, the end side ER1, end side ER2 and end side ER3 form a recess portion which is recessed more on the inside of the pixel electrode 130 than the end side ERB of the transition nucleus pattern 131.

The other end of the end side ER3 is connected to one end of an end side ER4. The end side ER4 extends in a direction substantially parallel to the rubbing direction AD, and extends more on the inside of the pixel electrode 130 than the end side ERB. The end side ER3 and end side ER4 form a triangular protrusion portion which protrudes more on the end side EL side than the end side ERB of the transition nucleus pattern 131.

The other end of the end side ER4 is connected to one end of an end side ER5. The end side ER5 extends substantially parallel to the signal line 108. The other end of the end side ER5 is connected to one end of an end side ER6. The end side ER6 extends in a direction substantially perpendicular to the rubbing direction AD. The other end of the end side ER6 is connected to the end side ERB. Specifically, the end side ER4, end side ER5 and end side ER6 form a recess portion which is recessed more on the inside of the pixel electrode 130 than the end side ERB of the transition nucleus pattern 131.

The end side EL overlaps the associated signal line 108, and includes a neighboring transition nucleus pattern 131L which faces the transition nucleus pattern 131 of the end side ER. The end side EL includes end sides ELB which extend substantially parallel to the signal line 108 from both ends of the transition nucleus pattern 131L.

The neighboring transition nucleus pattern 131L includes an end side EL2 which is recessed more on the inside of the pixel electrode 130 than the end side ELB, and extends substantially parallel to the signal line 108. One end of the end side EL2 is connected to an end side EL1 which extends substantially perpendicular to the rubbing direction AD. The end side EL2 and the end side ELB are connected by the end side EL1.

The other end of the end side EL2 is connected to one end of an end side EL3. The end side EL3 extends in a direction substantially perpendicular to the rubbing direction AD, and protrudes beyond the center of the width of the signal line 108 in the X direction. The end side EL1, end side EL2 and end side EL3 form a recess portion which is recessed more on the inside of the pixel electrode 130 than the end side ELB of the neighboring transition nucleus pattern 131L.

The other end of the end side EL3 is connected to one end of an end side EL4. The end side EL4 extends in a direction substantially parallel to the direction in which the signal line 108 extends. The other end of the end side EL4 is connected to one end of the end side EL5. The end side EL5 extends in a direction substantially perpendicular to the rubbing direction AD, and extends more on the inside of the pixel electrode 130 than the end side ELB.

The end side EL3, end side EL4 and end side EL5 form a substantially rectangular protrusion portion of the neighboring transition nucleus pattern 131L. This portion protrudes beyond the center of the signal line 108 in the X direction. The end side ER2 and end side EL4 face to each other, and extend substantially in parallel. The end side ER3 and end side EL5 face to each other, and extend substantially in parallel.

The other end of the end side EL5 is connected to one end of the end side EL6. The end side EL6 extends substantially in parallel with the signal line 108. The end side EL6 faces an apex of the triangular protrusion composed of the end side ER3 and end side ER4.

The other end of the end side EL6 is connected to one end of the end side EL7. The end side EL7 extends substantially in parallel to the rubbing direction AD. The end side EL7 and end side ER4 face to each other, and extend substantially in parallel. As described above, the end side EL5, end side EL6 and end side EL7 form a recess portion which is recessed more on the inside of the pixel electrode 130 than the end side ELB of the neighboring transition nucleus pattern 131L. The other end of the end side EL7 is connected to the end side ELB.

Specifically, as shown in FIG. 7, the triangular protrusion portion, which is composed of the end side ER3 and ER4, faces the recess portion which is composed of the end side EL5, end side EL6 and end side EL7. The recess portion, which is formed by the end side ER1, end side ER2 and end side ER3, faces the substantially rectangular protrusion portion which is composed of the end side EL3, end side EL4 and end side EL5.

In the liquid crystal display device of the present example, the width L1 of the signal line in the X direction is about 12 µm; the distance L2 between the end side ELB and the end side of the signal line 108 is about 3.5 µm; the distance L3 between the end side ER4 and end side EL7 is about 5.0 µm; the distance L4 between the connection part between the end side ER3 and end side ER4, on the one hand, and the end side EL6, on the other hand, is about 3.0 µm; the distance L5 between the connection part between the end side ER3 and end side ER4, on the one hand, and the end side ER2, on the other hand, is about 7.0 µm; the distance L6 between the end side ER3 and end side EL5 is about 5.0 µm; the length L7 of the end side EL4 is about 7.0 µm; the distance L8 between the end side ER2 and end side EL4 is about 3.0 µm; the distance L9 between the end side EL1 and end side EL3 is about 5.0 µm; the distance L10 between the end side EL2 and the end side of the signal line 108 is about 1.5 µm; and the length L11 of the transition nucleus pattern 131 in the Y direction is about 33.5 µm.

Like the above-described examples, in the state in which the liquid crystal display device was kept at room temperature and the backlight was turned on, scanning pulses were successively applied to the scanning lines 104, and a voltage with an amplitude of 5 V (±2.5 V) with reference to 2.5 V, which has an alternately reversed polarity in every frame, was applied to the signal lines 108. In addition, a voltage with an amplitude of 30 V (±15 V) with reference to 2.5 V, which has an opposite polarity to the voltage of signal lines 108, was applied alternately to the common electrode 230 in every frame.

Each pixel of the above-described liquid crystal display device was observed under the microscope. As a result, it was found that the average value of the time that was needed until the transition of the liquid crystal material from the splay alignment to the bend alignment in one pixel was 0.08 second. The average time that was needed until completion of the transition over the entire screen, which was obtained by repeated measurements, was 0.15 second.

From the above result, each of the first embodiment and the second embodiment of the invention can provide a liquid crystal display device having a high aperture ratio and a high contrast ratio, wherein the transition from the splay alignment to the bend alignment can be performed in all pixels with simple devices and simple driving circuit structure.

The present invention is not limited directly to the above-described embodiments. In practice, the structural elements can be modified and embodied without departing from the spirit of the invention. FIG. 1 to FIG. 4 show the structure in which the transition nucleus pattern 131 is provided on the peripheral part of the pixel. Alternatively, the transition nucleus pattern 131 may be provided at an opening part inside of the pixel.

The speed of progress of the transition, which begins from the part where the transition nucleus pattern 131 is provided, becomes higher from the beginning end side toward the terminal end side in the rubbing direction AD of the alignments film 140 and 240 than that to other directions. Accordingly, the time that is needed until completion of the transition can be decreased by providing the transition nucleus pattern 131, at least, on the beginning side of the rubbing direction AD of the alignment film.

In the liquid crystal display device according to the third embodiment, the transition nucleus pattern 131 and the neighboring transition nucleus pattern 131L, which are shown in FIG. 7, are employed. Alternatively, a transition nucleus pattern, in which the transition nucleus pattern 131 and neighboring transition nucleus pattern 131L shown in FIG. 7 are continuously formed, may be employed. The sizes and positions of the respective recess portions and protrusion portions may be properly varied.

In FIG. 1 to FIG. 4 the active matrix liquid crystal display device is shown. Alternatively, the liquid crystal display device may adopt other driving methods, such as a simple matrix driving method. The type of driving method of the liquid crystal display device is not particularly limited.

Various inventions can be made by properly combining the structural elements disclosed in the embodiments. For example, some structural elements may be omitted from all the structural elements disclosed in the embodiments. Furthermore, structural elements in different embodiments may properly be combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An OCB mode liquid crystal display device comprising:
   a first substrate including a first insulating substrate, a first electrode located on the first insulating substrate, a second electrode located between the first insulating substrate and the first electrode via an insulating underlayer interposed between the second electrode and the first electrode, and a first alignment film on the first electrode;
   a second substrate including a second insulating substrate, a third electrode on the second insulating substrate, and a second alignment film on the third electrode;
   a liquid crystal layer which is held between the first electrode and the third electrode and which exhibits a transition from a first state to a second state in an initializing process; and
   a voltage supply unit which supplies, in the initializing process, a first voltage to the first and the second electrodes and a second voltage, which is different from the first voltage, to the third electrode,
   wherein the first electrode includes a transition nucleus forming section which forms at least one of nuclei of the transition in the liquid crystal layer on the basis of the respective voltages supplied to the respective electrodes,
   the transition nucleus forming section includes a bend pattern including a recess portion which is recessed more on an inside of the first electrode than an end side of the first electrode and a width of the recess portion in a direction of extension of the end side of the first electrode is ½ or more of a thickness of the liquid crystal layer,
   the first alignment film and the second alignment film are subjected to alignment treatment in mutually parallel directions, thereby defining an alignment direction in the liquid crystal layer, and
   a thickness of the insulating layer is ⅕ or more of a thickness of the liquid crystal layer.

2. The OCB mode liquid crystal display device according to claim 1, wherein the bend pattern includes an end side crossing the alignment direction.

3. The OCB mode liquid crystal display device according to claim 1, wherein a thickness of the insulating underlayer is 1 μm or more.

4. The OCB mode liquid crystal display device according to claim 1, wherein the bend pattern includes a recess portion which is recessed more on an inside of the first electrode than an end side of the first electrode, and
   a width of the recess portion in a direction of extension of the end side of the first electrode is 2 μm or more.

5. The OCB mode liquid crystal display device according to claim 1, wherein the first substrate further includes a signal line which supplies a predetermined video signal to the first electrode, and a thin-film transistor which switches a state of conduction between the signal line and the first electrode, and the second electrode is a drain electrode of the thin-film transistor.

6. The OCB mode liquid crystal display device according to claim 1, wherein the second electrode is a signal line which supplies a video signal to the first electrode.

7. The OCB mode liquid crystal display device according to claim 2, wherein the bend pattern is provided at least on an end side on a beginning end side of the alignment direction of the first electrode.

8. The OCB mode liquid crystal display device according to claim 1, wherein the first state is a splay alignment state, and the second state is a bend alignment state.

9. The OCB mode liquid crystal display device according to claim 2, further comprising a signal line which supplies a predetermined video signal to the first electrode,
   wherein the alignment direction is a direction crossing a direction of extension of the signal line, and
   the bend pattern is composed of an end side which is substantially parallel to the alignment direction, an end side which is substantially perpendicular to the alignment direction, and an end side extending substantially parallel to the direction of extension of the signal line.

* * * * *